United States Patent Office 3,033,889
Patented May 8, 1962

3,033,889
PHOSPHATE ESTERS OF BRANCHED CHAIN ALCOHOLS
Max Eugene Chiddix, Easton, Pa., and Charles Richard Enyeart, Plainfield, N.J., assignors to General Aniline & Film Corporation, New York, N.Y., a corporation of Delaware
No Drawing. Filed Oct. 21, 1958, Ser. No. 768,568
7 Claims. (Cl. 260—461)

This invention relates to the production of esters of oxyalkylene derivatives of branched chain alcohols and more particularly to esters of oxyalkylene derivatives of long chain primary aliphatic alcohols containing at least three side chains.

It is an object of this invention to provide wetting agents and detergents derived from branched chain alcohols. Another object is the provision of novel oxyalkylene derivatives with improved properties. Other objects and advantages will appear as the description proceeds.

The aforementioned objects are obtained by the instant invention which is directed to compounds which may be obtained by reacting from about 1 to 12 moles of ethylene oxide or propylene oxide with 1 mole of a primary aliphatic alcohol of about 10 to 20 carbon atoms containing at least three side chains, followed by esterification with a phosphating agent.

These compounds may be described generically as compounds selected from the group consisting of the phosphate ester of an oxyalkylene ether of a primary aliphatic alcohol of 10 to 20 carbon atoms having the molecular configuration of an alcohol produced by the Oxo process from an olefin containing 9 to 19 carbon atoms and at least 2 side chains, said ether containing from about 1 to 12 oxyalkylene groups of 2 to 3 carbon atoms each per mole, and the alkali metal, alkaline earth metal, ammonium, and amine salts of such ester. The preferred compounds herein are the phosphate esters of oxyethylene ethers of the tridecyl alcohol produced by the Oxo process from a 12 carbon olefin containing at least 2 side chains such as tetrapropylene or triisobutylene, said ether containing from about 4 to 8 oxyethylene groups per mole, in free form or in the form of its sodium or ammonium salt.

Branched chain primary aliphatic alcohols which may be used are 2,4,5,5,7-pentamethyl-1-octanol,
2,3,5,7-tetramethyl-1-nonanol,
2,4,7-trimethyl-1-nonanol,
2,4,5,6,8-pentamethyl-1-nonanol,
2,6,7-trimethyl-3-ethyl-1-octanol,
2,4,6,8-tetramethyl-1-nonanol,
2,3,5-trimethyl-4,7-diethyl-1-octanol,
2,3,5,6-tetramethyl-5,7-diethyl-1-octanol,
3,5-dimethyl-4,6-diethyl-1-heptanol,
3,4,5-trimethyl-4,6-diethyl-1-heptanol,
2-ethyl-3,5,7-trimethyl-1-octanol,
2-ethyl-4,6-dimethyl-1-octanol,
2,5,7,7-tetramethyl-1-octanol,
3,5,7,7-tetramethyl-1-octanol,
2,5-diethyl-3,7-dimethyl-1-octanol, and
2,5,7,9-tetramethyl-1-decanol.

Preferably these and other alcohols may be used which are prepared by the catalytic reaction of an olefin containing at least 2 side chains such as tripropylene, tetrapropylene, pentapropylene, hexapropylene, triisobutylene, tetraisobutylene, tributane, 4,6,8-trimethyl-1-nonene, 4,6,8-trimethyl-2-nonene, mixed propene-butene and propane-isobutene polymers, 5,7,7-trimethyl-1-octene, 3,5,7-trimethyl-1-heptene, and 2,4,6,6,8-pentamethyl-1-nonene, with carbon monoxide and hydrogen to form an aldehyde followed by catalytic reduction of this aldehyde to an alcohol. This two stage process is known as the Oxo process. This process always results in a major proportion of branched chain products according to Storch, Golumbic, and Anderson ("The Fischer-Tropsch and Related Syntheses," chapter 5, page 441, John Wiley and Sons, New York, 1951). According to this work, even straight chain 1-olefins react in two ways in the first step of the Oxo process giving rise to branched chain products. In the presence of a catalyst such as a reactive salt of cobalt, the olefin may add carbon monoxide and hydrogen according to the following scheme:

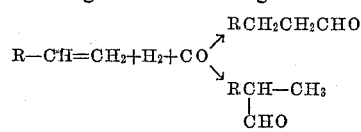

The olefin also readily isomerizes in the presence of the Oxo catalyst and thus greatly increases the chances for branching in the final alcohol:

$RCH=CH_2 \rightarrow R'CH_2CH=CH—CH_3 \rightarrow$
$R'CH=CHCH_2CH_3$

The following branched chain alcohols would be produced from these olefins:

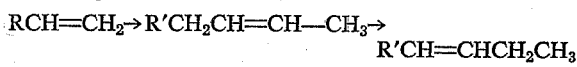

It can be seen that when the olefin has a branched chain structure to start with, there will be two or more points of branching in the final alcohol, and when the precursor olefin has two or more side chains, an alcohol will be produced containing one more carbon atom and three or more (one more than in the olefin) side chains.

The starting alcohols employed in producing the compounds of this invention may be condensed with the required number of moles of ethylene oxide or propylene oxide or a mixture of the two oxides in known manner. The condensation is preferably carried out under raised temperatures and pressures, and may be catalyzed by quaternary hydroxides, amines, or acidic and coordinating type compounds, although the strong alkaline catalysts such as KOH or NaOH and the like are preferred because of the fewer by-products formed and the more easily controllable reaction conditions.

While it is presumed that in the case of propylene oxide, products of type I below are formed, especially when using an alkaline catalyst, it is realized that some type II products may also be formed. This is particularly true when the reaction is carried out using an acidic catalyst (e.g. $BF_3$, $H_2SO_4$):

Type I          $R—O(CH_2—CHO)_n—H$
                                         $CH_3$ Type II         $R—O(CH—CH_2O)_nH$
                                       $CH_3$ The condensation products thus obtained are then esterified in known manner with a phosphating agent such as phosphoric acid, polyphosphoric acid, phosphorus pentoxide, phosphorus oxychloride or phosphorus pentachloride or mixtures thereof.

The resulting esters may then if desired be neutralized with a basic material such as sodium hydroxide, potassium hydroxide, sodium carbonate, sodium acetate, ammonium hydroxide, ammonia, calcium oxide and hydroxide, magnesium oxide and hydroxide, strontium hydroxide, ethanolamine, diethanolamine, triethanolamine, methylamine, dimethylamine, trimethylamine, ethylamine, triethylamine, diethylamine, butylamine, propylamine, cyclohexylamine, morpholine, pyridine and the like.

General methods for carrying out the oxyalkylation reaction, the esterification and the salt formation are illustrated in U.S. Patents 1,970,578, 2,174,761, and 2,167,326, and German Patent 696,317.

Better detergency and in some cases a higher level of foam is also found for this branched chain type of product. The products of this invention are for this reason to be distinguished from the phosphate esters of polyoxyalkylenated straight chain alcohols derived from natural sources and therefore having an even number of carbon atoms such as lauryl alcohol and the like. The phosphate esters of this invention are further advantageous in being less corrosive to equipment in contact therewith, and less harmful than the sulfate esters of the same or previously employed oxyalkylenated alcohols.

The possible applications of these new substances are extremely varied. The most conspicuous property of these new products is their great activity at surfaces and interfaces which promotes their use in a large field of the technical arts. For instance, they can be used as wetting, frothing, or washing agents in the treating and refining of textiles; for converting liquid or solid substances which per se are insoluble in water (such as hydrocarbons, higher alcohols, oils, fats, waxes and resins) into creamy emulsions, clear solutions or fine, stable dispersions; for carbonizing; for dyeing; for the pasting of dyestuffs; for fulling, sizing, impregnating and bleaching treatments; as cleansing agents in hard water; in tanning and mordanting processes; for dyeing acetate with insoluble dyestuffs; for the preparation of dyestuffs in finely divided form; for producing foam in fire extinguishers; as a means for improving the absorptive power of fibrous bodies; and as an aid in softening baths for hides and skins.

In addition, these products are valuable emulsifiers for insecticide compositions and agricultural sprays such as DDT, 2,4-D, dormant or mineral oil sprays, nicotine sulfate, and the like.

These products are valuable for use as additives to petroleum products, as additives for fuel oils, hydraulic fluids, lubricating oils, cutting oils, greases, as additives to the water or brine used for oil recovery from oil-bearing strata by flooding techniques.

Other valuable uses are in metal cleaning compositions, dry cleaning compositions, additives for rubber latices, foam inhibitors for synthetic rubber latex emulsions, froth flotation agents, additives for road building materials, as air entraining agents for concrete or cement; additives to asphalt compositions, plasticizers and modifiers for vinyl plastics, alkyd resins, phenol-formaldehyde resins, and other types of polymeric-type plastic materials; for incorporation into adhesives, paint, linoleum and the like; for use in bonding agents used in various insulating and building materials; as refining aids in wood digesters to prepare pulp; as additives to pulp slurries in boating operations to prevent foaming and also to aid the beating operation in paper-making; and for use in dishwashing compositions.

These products are also useful as emulsifiers for emulsion polymerization, as mercerizing assistants, wetting agents, re-wetting agents, dispersing agents, detergents, penetrating agents, softening agents, cutting oils, lime soaps dispersants, dish-washing agents, anti-static agents, disinfectants, insecticides, mothproofing agents, bacteriocides, fungicides and biocides.

They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

These products are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals, espescially ferrous metals, in acid pickling baths, in acid cleaning compositions, and in electroplating baths.

Other valuable uses are as solvents, as cleaning agents for paint brushes, as additives for paints, lacquers, and varnishes; as greases, and stuffing agents.

These products are valuable in the preparation of skin creams, lotions, salves and other cosmetic preparations such as home hair-waving sets, shampoos, toothpastes, etc. They may alo be of value in food products as foaming agents, emulsifying agents, and softening agents.

The products of this invention may advantageously be employed in wetting, foaming, emulsifying, and/or detergent compositions containing other anionic surface active agents, nonionic surface active agents, foaming and other agents, and/or builders and the like. As representative of such other anionic surface active agents, there may be mentioned alkyl aryl sulfonates, alkyl sulfates, N-acyl taurines, sulfate esters of polyoxyalkylenated higher molecular weight organic compounds containing an active hydrogen atom including the multi-branched chain alcohols of the present invention, and the like. As representative nonionic surface active agents there may be mentioned the polyoxyalkylenated higher molecular weight organic compounds containing an active hydrogen atom as disclosed for example in U.S. Patent No. 1,970,578, and many other patents. Illustratively, such agents include the reaction products of a plurality of moles of ethylene oxide with fatty acids such as stearic acid, alcohols such as lauryl alcohol and the multi-branched chain alcohols described above, alkyl phenols such as nonylphenol, fatty amines such as dodecylamine, mercaptans such as dodecyl mercaptan, amides such as lauroyl amide, and the like. As representative foaming agents there may be mentioned the fatty acid alkanol amides such as lauroyl diethanolamide and the like. The common components of built or heavy duty detergent compositions include alkaline builders such as the alkali metal salts of ortho-, meta-, poly- and pyro-phosphoric acids, including sodium hexametaphosphate, sodium pyrophosphate, trisodium phosphate, sodium tripolyphosphate, and the like, in addition to water-soluble derivatives of high polyoses such as sodium carboxymethyl cellulose, and other water-soluble salts for adjustment of pH, buffering, and the like such as sodium carbonate, sodium sesquicarbonate, sodium bicarbonate, sodium chloride, sodium sulfate, sodium bisulfate, sodium metasilicate, and the like.

The following examples are illustrative of the instant invention and are not be regarded as limitative:

*Example 1*

Charge:
Into the autoclave—
474 g. (2.366 mols) Oxo-tridecyl alcohol ($C_{13}H_{27}OH$ poly branched chain primary alcohol prepared from tetrapropylene by the Oxo process)
1.9 g. NaOH Into an ethylene oxide reservoir—
630 g. (14.32 mols) ethylene oxide The Oxo-tridecyl alcohol and sodium hydroxide were charged into the autoclave and the autoclave heated to reaction temperatures, 140° C. Ethylene oxide gas was then admitted gradually from the reservoir. The reaction pressure was regulated at 25 to 30 lb. p.s.i. during the reaction. When absorption was complete, the product was discharged. The total yield of product was 1104 g. This weight of product minus the weight of the charged tridecyl alcohol and catalyst equal the amount of ethylene oxide which reacted. These weights are substituted in the formula $$\frac{\text{Wt. E. O. reacted} \times 200.4}{\text{Wt. alcohol charged} \times 44} = \text{mol ratio}$$

where 200.4 and 44 are the molecular weights of Oxo tridecyl alcohol and ethylene oxide respectively. The mol ratio was 6.0.

The product had a varnish color No. of 3 and a solidification point of 5–6° C.

*Example 2*

To 46.6 g. of the reaction product of tridecyl alcohol (Oxo process) and 6 moles of ethylene oxide, prepared in the manner of Example 1, were added, during 5 minutes, a mixture of 11.5 g. of 85% $H_3PO_4$ and 9.23 g. of $P_2O_5$. The temperature rose from 30° C. to 53° C. during this time. The liquid reaction mixture was stirred for 2½ hours at 60° C. and was then transferred into a solution of 16 g. of NaOH in 110 g. of water. After thorough mixing, the solution had a pH of 7.8. Additional water was added to bring the active ingredient content of the solution to 11.7%. The active ingredient was calculated as the disodium phosphate ester of the reaction product of the tridecanol and 6 moles of ethylene oxide. The final 11.7% solution foamed copiously on shaking. This compound was superior in wetting power to that of Example 3 on an active ingredient basis as measured by the Draves Wetting Test, described in the 1942 Yearbook of the AATCC, pp. 248–254, according to which 0.54 g. of this compound per liter of solution was required to give a sinking time of 25 seconds with a 3 g. hook.

*Example 3*

(Note: For comparison with Ex. 2, since lauryl alcohol is not a branched chain alcohol.)

This preparation was made in the same manner as Example 2, except that the reaction product of the Oxo tridecyl alcohol and 6 moles of ethylene oxide was replaced with 45.3 g. of the reaction product of lauryl alcohol and 6 moles of ethylene oxide. The product was in the form of a 20% solution calculated as the disodium phosphate ester of the reaction product of lauryl alcohol and 6 moles of ethylene oxide. The pH was 8.25. When subjected to the Draves Wetting Test described in Example 2, 1.08 g./l. was found to be required to give the same 25 second sinking time.

*Example 4*

Into a 1 liter, 4-necked flask equipped with a stirrer, thermometer, dropping funnel and reflux condenser protected by a calcium chloride tube was placed 569.4 g. (1.12 moles) of the reaction product of 7 moles of ethylene oxide with 1 mole of the Oxo tridecyl alcohol (from tetrapropylene by the Oxo process). There was then added 44.8 g. (0.28 mole) of polyphosphoric acid ($P_2O_5 \cdot H_2O$—Victor Chemical Works) while heating with a Glas-col mantle. The reaction mixture was heated to 115° C. and maintained at that temperature for 5 hours. The phosphate ester of the said reaction product was obtained in the substantially theoretical yield of 614.8 g. as an amber, mobile liquid. When measured by the Draves Wetting Test above described 0.38 g. per liter of solution was required. It had very good foaming properties and excellent properties as a dishwashing assistant.

*Example 5*

The process of Example 4 was repeated except that the amounts of reactants employed were 1,016.8 g. (2.0 moles) of the ethylene oxide-Oxo tridecyl alcohol reaction product, and 160 g. (1.0 mole) of the polyphosphoric acid. This phosphate ester was obtained in the substantially theoretical yield of 1,172.4 g. as an amber, mobile liquid. When tested by the above described Draves Wetting Test, 0.75 g. per liter of solution was required. The product had slightly better foaming properties and slightly inferior properties as a dishwashing agent as compared with the product of Example 4.

*Example 6*

Into a 1 liter, 4-necked flask equipped with a stirrer, thermometer, dropping funnel and a reflux condenser connected to HCl traps (1.0 N NaOH solution) was placed 1 mole of the ethylene oxide-tridecyl alcohol reaction product employed in Examples 4 and 5. While stirring the mixture under slight vacuum, 0.5 mole of phosphorus oxychloride was added dropwise over a 55 minute period. The temperature rose from about 27° to 52° C. When the addition was complete, the dropping funnel was replaced by a gas-inlet tube connected to a source of dry air. A slow stream of air was now allowed to flow through the reaction mixture and it was gradually heated from 52° to about 82° over a period of about 5 hours. The pressure was then lowered to 200 mm. and the temperature increased to 87° C. over a 55 minute period when 1,135 milliequivalents of HCl had been trapped. It was allowed to cool to room temperature, 18 ml. of distilled water was added, and the reaction mixture then heated to 108° C. over a period of about 5½ hours. An additional 18 ml. of distilled water was added and the reaction mixture heated to 143° C. over a period of about 10½ hours while the pressure was gradually dropped to 10 mm. At this point, 81.0% of the theoretical amount of HCl had been evolved. The reaction mixture was neutralized to pH 7.1 by addition of 40% NaOH and the water removed from the reaction mixture by heating on a steam bath under vacuum. A product similar to that of Example 4 was obtained in substantially theoretical yield.

*Example 7*

The process of Example 2 is repeated, but using as the precursor alcohol a tridecyl alcohol produced by the Oxo process from triisobutylene instead of tetrapropylene. A phosphate ester is obtained having properties similar to those of the product of Example 2.

Where a branched chain Oxo alcohol is indicated in the foregoing specification, it is to be considered a mixture of Oxo alcohols having chain lengths averaging the stipulated values rather than being pure products. It will also be understood by those versed in this art that the reaction of one mole of one or a mixture of such alcohols with a plurality of moles of 1,2-alkylene oxide containing 2 to 3 carbon atoms (ethylene oxide or propylene oxide) will result in a mixture of ether molecules of varying oxyalkylene chain length averaging the molar amount of reacted alkylene oxide.

It will be similarly obvious that phosphate esters of the type disclosed above and containing more than 12 oxyalkylene groups per molecule may be found advantageous in certain usages.

Various modifications and variations of this invention will be obvious to a worker skilled in the art and it is understood that such modifications and variations are to be included within the purview of this application and the spirit and scope of the appended claims.

This application is a continuation in part of our application Serial No. 263,002, filed December 22, 1951, and now abandoned.

We claim:

1. A compound selected from the group consisting of the phosphate ester of an oxyalkylene ether of a primary aliphatic alcohol of 10 to 20 carbon atoms having the molecular configuration of an alcohol produced by the Oxo process from an olefin containing 9 to 19 carbon atoms and at least 2 side chains, said ether containing from about 1 to 12 oxyalkylene groups of 2 to 3 carbon atoms each per mole, and the alkali metal, alkaline earth metal, ammonium and amine salts of such ester.

2. A compound as defined in claim 1 wherein said oxyalkylene groups are oxyethylene groups.

3. A compound as defined in claim 2 wherein said alcohol is tridecyl alcohol and said olefin contains 12 carbon atoms.

4. A compound as defined in claim 3 containing 4 to 8 oxyethylene groups per mole.

5. A compound as defined in claim 3 wherein said olefin is tetrapropylene.

6. A compound as defined in claim 3 wherein said olefin is triisobutylene.

7. The sodium phosphate ester of the hexa-oxyethylene ether of the tridecyl alcohol having the molecular configuration of an alcohol produced by the Oxo process from tetrapropylene.

References Cited in the file of this patent

UNITED STATES PATENTS

| | | |
|---|---|---|
| 2,481,278 | Ballard et al. | Sept. 6, 1949 |
| 2,637,740 | Kosmin | May 5, 1953 |

FOREIGN PATENTS

| | | |
|---|---|---|
| 879,689 | France | Nov. 30, 1942 |